United States Patent
Hobson, III et al.

(10) Patent No.: US 8,020,614 B2
(45) Date of Patent: Sep. 20, 2011

(54) APPARATUS FOR THE DECOMPOSITION OF HYDROGEN PEROXIDE

(75) Inventors: Russell B Hobson, III, Lebanon, NJ (US); Samuel A Miller, III, Boonton, NJ (US)

(73) Assignees: Samuel A. Miller, III, Boonton, NJ (US); Hobson Leasing Inc., Lebanon, NJ (US)

( * ) Notice: Subject to any disclaimer, the term of this patent is extended or adjusted under 35 U.S.C. 154(b) by 1157 days.

(21) Appl. No.: 11/711,510

(22) Filed: Feb. 27, 2007

(65) Prior Publication Data
US 2008/0053065 A1 Mar. 6, 2008

Related U.S. Application Data

(60) Provisional application No. 60/841,417, filed on Aug. 31, 2006.

(51) Int. Cl.
*E21B 29/02* (2006.01)
*E21B 36/00* (2006.01)
(52) U.S. Cl. .................. 166/64; 166/90.1; 166/303
(58) Field of Classification Search ............. 166/303, 166/308.1, 64, 90.1
See application file for complete search history.

(56) References Cited

U.S. PATENT DOCUMENTS

| | | |
|---|---|---|
| 3,091,520 A | 5/1963 | Newburn |
| 3,135,089 A | 6/1964 | Dryden |
| 3,235,006 A | 2/1966 | Hujsak |
| 3,447,316 A | 6/1969 | White |
| 3,700,035 A | 10/1972 | Lange |
| 3,982,592 A | 9/1976 | Hamrick et al. |
| 4,069,664 A | 1/1978 | Ellion et al. |
| 4,385,661 A | 5/1983 | Fox |
| 4,423,780 A | 1/1984 | Vigneri et al. |
| 4,456,069 A | 6/1984 | Vigneri |
| 4,475,596 A | 10/1984 | Papst |
| 4,967,840 A * | 11/1990 | Miller ................... 166/303 |
| 5,884,642 A * | 3/1999 | Broadbent ........... 134/168 R |
| 6,756,021 B2 | 6/2004 | Botrel |
| 6,880,491 B2 | 4/2005 | Reiner et al. |
| 2004/0098984 A1 | 5/2004 | Duell et al. |

* cited by examiner

*Primary Examiner* — Michael Barr
*Assistant Examiner* — Saeed T Chaudhry
(74) *Attorney, Agent, or Firm* — Ladas & Parry LLP

(57) ABSTRACT

A method and apparatus for the decomposition of hydrogen peroxide, particularly for use as a hydrocarbon well bore and pipeline cleaning and maintenance aid. The apparatus includes a decomposition engine having an inlet manifold extending centrally within the housing and having means for passage of hydrogen peroxide through the manifold wall through a catalyst stack. The decomposition products produced are directed through an exit venturi. The decomposition products are passed through a piping system which allow the selective venting or introduction of the products into a facility to be cleared. Control means are coupled to the engine and valving to allow for the selective adjustment of temperature and or pressure of the decomposition products, as well as the introduction and diversion of the blend into the facility.

8 Claims, 7 Drawing Sheets

APPARATUS FOR THE DECOMPOSITION OF HYDROGEN PEROXIDE

The present application claims the priority of Provisional Application 60/841,417 filed Aug. 31, 2006.

The present invention relates to a new and improved apparatus and method for decomposing hydrogen peroxide, particularly for use as a hydrocarbon well bore and pipeline cleaning and maintenance aid.

BACKGROUND OF THE INVENTION

As oil and gas wells age their production often decreases. While a portion of such diminution is the obvious result of depletion of the hydrocarbon reservoir which is being tapped, the decrease of flow is often the result of the collection of higher weight hydrocarbons, such as paraffins in and near the bore hole and in the fractured hydrocarbon-bearing ground formation, which inhibit the hydrocarbon flow. In addition, the introduction of chemicals into the borehole for a variety of desired effects can, over the long term, cause flow blockage. In a similar manner, hydrocarbon pipelines may collect deposits which, over the long term, diminish the effective inner diameter of the pipe and thus limit its flow capacity.

A variety of techniques are known and have been applied to remediate such blockage conditions. These techniques include mechanical procedures, such as scraping, the introduction of further chemical treatments to react with and dissolve blockages, as well as, more recently, the application of sonic energy to attack the blockages. Each of such techniques have their advantages and disadvantages.

It is known to utilize hydrogen peroxide ($H_2O_2$) as a stimulation vehicle. As an active oxidizer, the direct injection of hydrogen peroxide into a well serves as a chemical reactant. Because of its high reactivity, however, the injection of hydrogen peroxide into a well is fraught with difficulties and potential hazards. In addition, ever-tightening environmental standards preventing the discharge of hazardous materials into the environment further mitigate against the direct injection of hydrogen peroxide.

It is also known to use hydrogen peroxide as a decomposition agent. The decomposition products of hydrogen peroxide are water and oxygen. The decomposition of hydrogen peroxide by use of an appropriate catalyst generates a high temperature mixture of oxygen and water in the form of water vapor or steam, and the injection of such a mixture into a well has found some measure of commercial value. As decomposition products, both oxygen and water can be vented to the environment without the environmental risk or harm associated with other agents.

U.S. Pat. No. 3,235,006 to Hujsak discloses the direction of hydrogen peroxide into a well pipe. A catalyst is located within the well at the lower end of the pipe. Upon contact with the catalyst the injected peroxide decomposes, the decomposition products performing a stimulation treatment. Such methodology requires care to keep the peroxide free of potential reactants as it is delivered down the piping. The decomposition reaction is also difficult to monitor and is uncontrolled. U.S. Pat. No. 4,475,596 to Papst utilizes a similar system in which a decomposition reaction is initiated within the borehole at or above the level of the formation to be treated.

U.S. Pat. No. 4,967,840 of Nov. 6, 1990 to Miller discloses an apparatus for decomposing hydrogen peroxide especially for use as a flow stimulation media for hydrocarbon-bearing formations and discloses a basic system and method for its use in association therewith, in which the decomposition is performed outside the well, and the reaction products directed into the well. As the introduction of any stimulation product into a hydrocarbon well must be carefully controlled and monitored, however, the '840 patent is deficient in that it neither provides an apparatus for efficient control or generation of the decomposition products, nor allows supervision or control over the metering of the decomposition products into a well or other facility.

It is accordingly a purpose of the present invention to provide a method and apparatus for performing a decomposition reaction for hydrogen peroxide outside a well or other structure to which the decomposition products are to be introduced and utilizing the decomposition products in connection with well stimulation and pipeline cleaning.

A further purpose of the present invention is to provide such an apparatus which allows the decomposition reaction to be controlled, monitored and adjusted in an efficient and ongoing manner.

BRIEF DESCRIPTION OF THE INVENTION

In accordance with the foregoing and other objects and purposes, the present invention comprises a hydrogen peroxide decomposition engine with a decomposition chamber having a central pathway into which concentrated hydrogen peroxide is introduced, a catalyst shell through which the hydrogen peroxide passes and is converted into its decomposition products, and an exit venturi for controlling the flow of the hot, high-pressure, decomposition products. The control system of the present invention comprises a series of valves and pumps for the hydrogen peroxide as well as air, water and actional chemicals that may be added to the injected steam/oxygen mixture as well as valve and pump control means. Gauges and control means are preferably arrayed on a master control panel, the main control means for delivery of the hydrogen peroxide into the decomposition element being an electro-hydraulic joystick coupled to a pump for the peroxide. The decomposition products are thus monitored and metered into the well or other targeted structure in an efficient, safe and controlled manner.

BRIEF DESCRIPTION OF THE DRAWINGS

A fuller understanding of the present invention will be achieved with consideration of the annexed drawings, wherein.

DETAILED DESCRIPTION OF THE INVENTION

Figure 1:
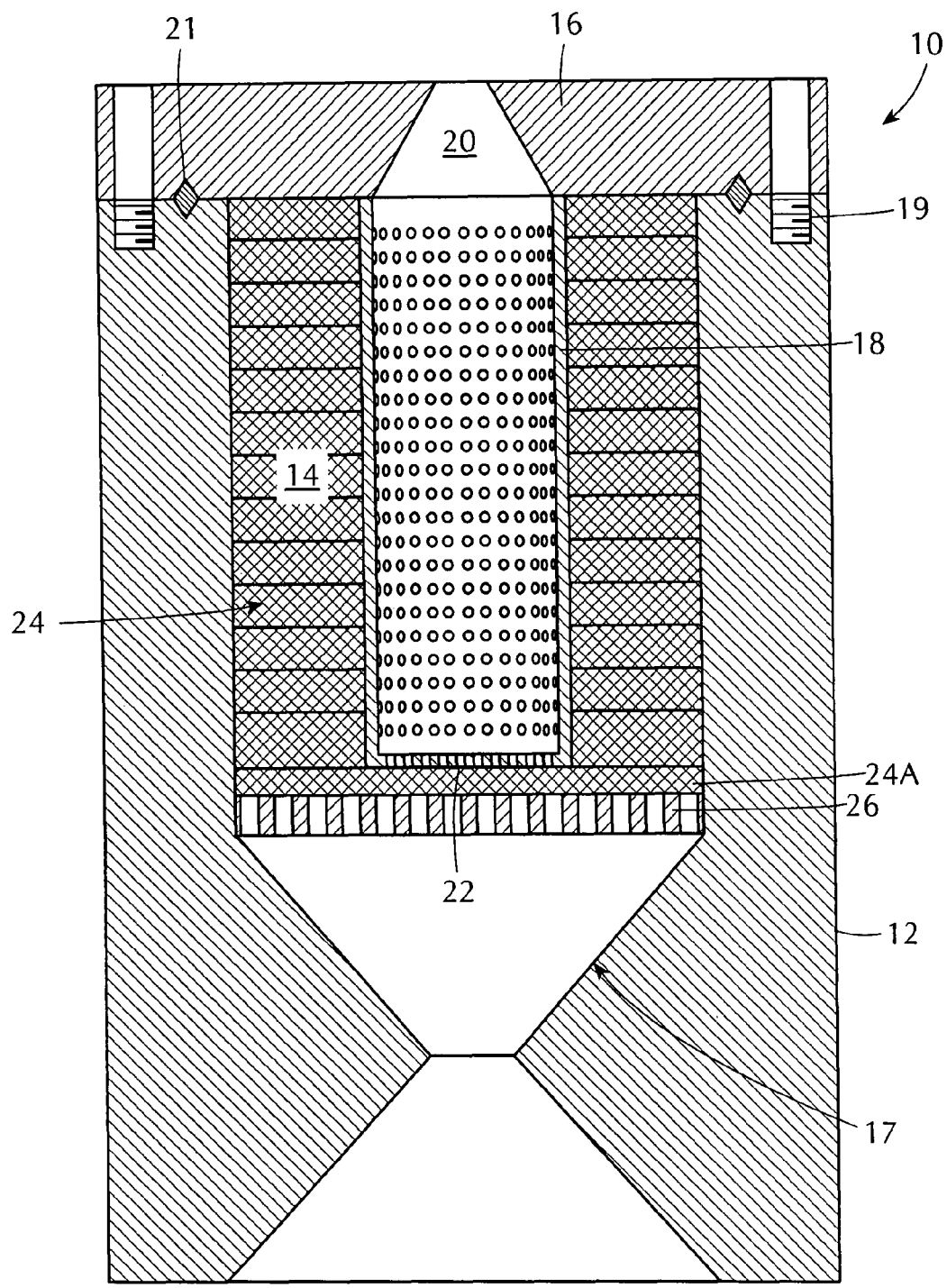
FIG. 1 is a cross-sectional view of a hydrogen peroxide decomposition engine in accordance with the invention.
Figure 2:
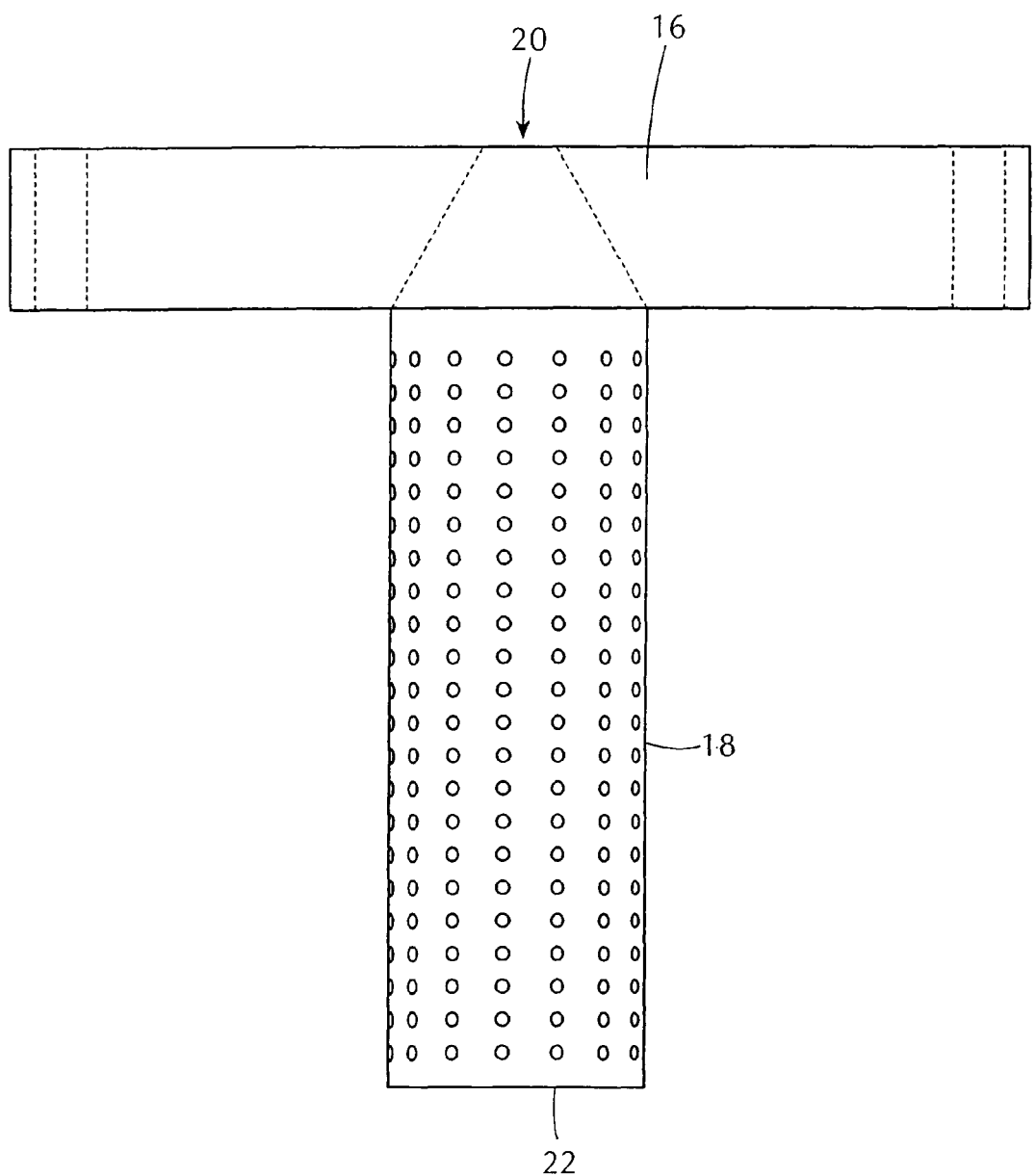
FIG. 2 is an elevation view of the inlet port assembly thereof.

With initial reference to FIGS. 1-4, hydrogen peroxide decomposition engine 10 comprises a generally cylindrical housing 12, which may be on the scale of approximately 2 feet long. The housing is formed with a generally cylindrical central bore 14 which carries the decomposition reactor, as described infra. The central bore 14 terminates at its rear end in a converging/diverging venturi 17 formed in the housing through which the decomposition products exit the engine. As further depicted in FIGS. 1 and 2, the inlet side of the catalyst engine 10 has top plate 16 which is bolted to the top of the housing 12 through aligned bolt holes 19 and to which central perforated cylinder 18 is mounted, such as by welding. A sealing ring 21 is mounted in aligned circumferential notches in the top of the housing and on the bottom of the top plate to seal the top plate to the housing. The ring 21 may be of copper or other appropriate material to withstand the high temperature of the engine when in operation. Concentrated hydrogen peroxide is introduced through the top plate 16 and into the center of cylinder 18 through entranceway 20 in top plate 16. The bottom end 22 of cylinder 18 is also perforated, whereby the introduced hydrogen peroxide flows outwardly through the perforations in the cylinder sidewall and bottom end.

Figure 4:
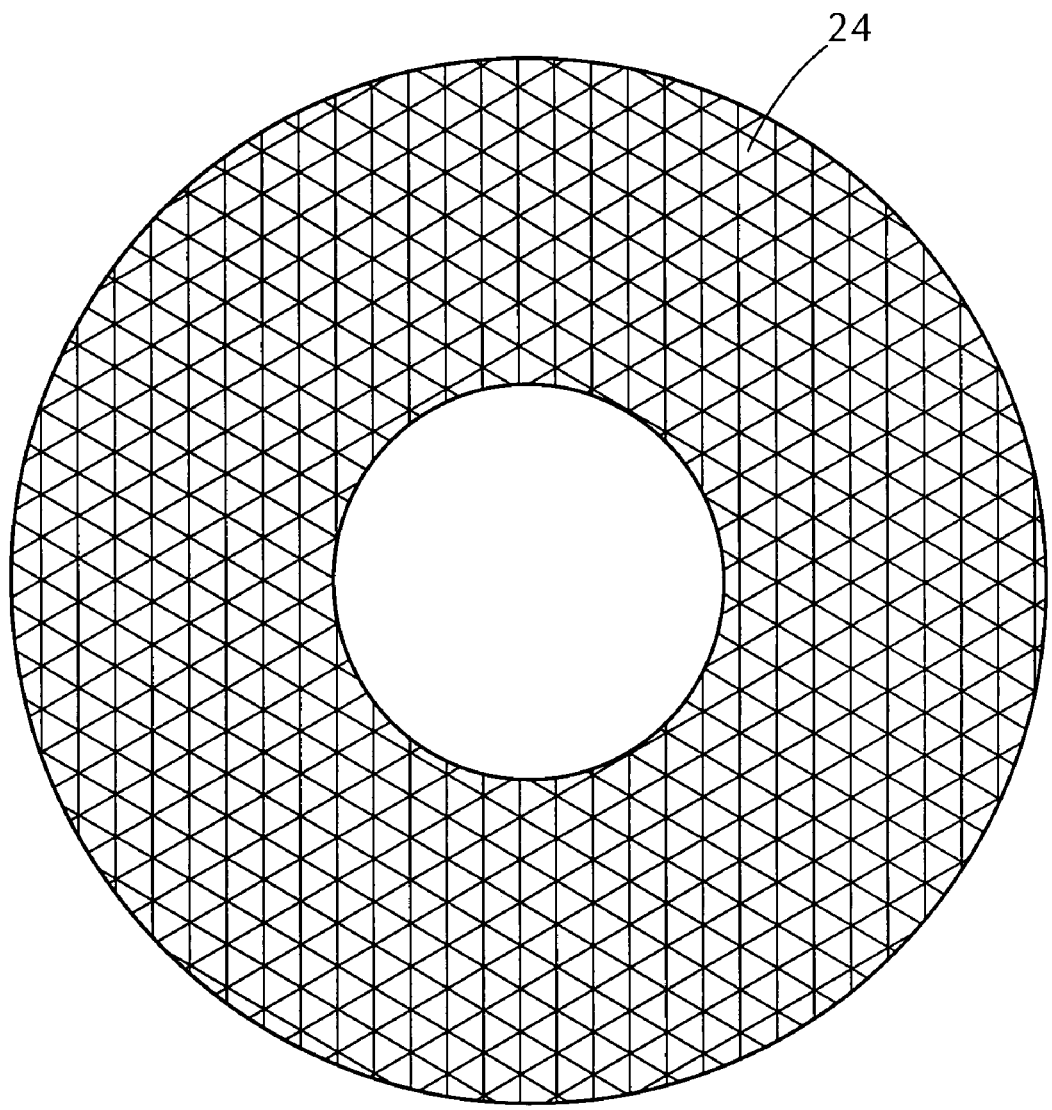
FIG. 4 is a plan view of a catalyst element thereof.

Surrounding the cylinder 18 within the engine's central bore 14 are a series of stacked catalyst elements 24. As seen in FIG. 4, each of the catalyst elements 24 is preferably ring-shaped, and are thus stackable within the central bore 14, fitting between the housing wall and the perforated cylinder 18. As known in the art, the catalyst elements 24 may be formed of a porous silver/copper/gold/platinum, the contact of concentrated hydrogen peroxide with the silver resulting in immediate decomposition of the hydrogen peroxide in an exothermic reaction to gaseous oxygen and water in the form of water vapor or steam. A catalyst disc 24A, as shown in FIG. 1, against which the bottom of the cylinder 18 contacts, provides the catalyst bed for the peroxide exiting through the perforated cylinder bottom 22.

Figure 3:
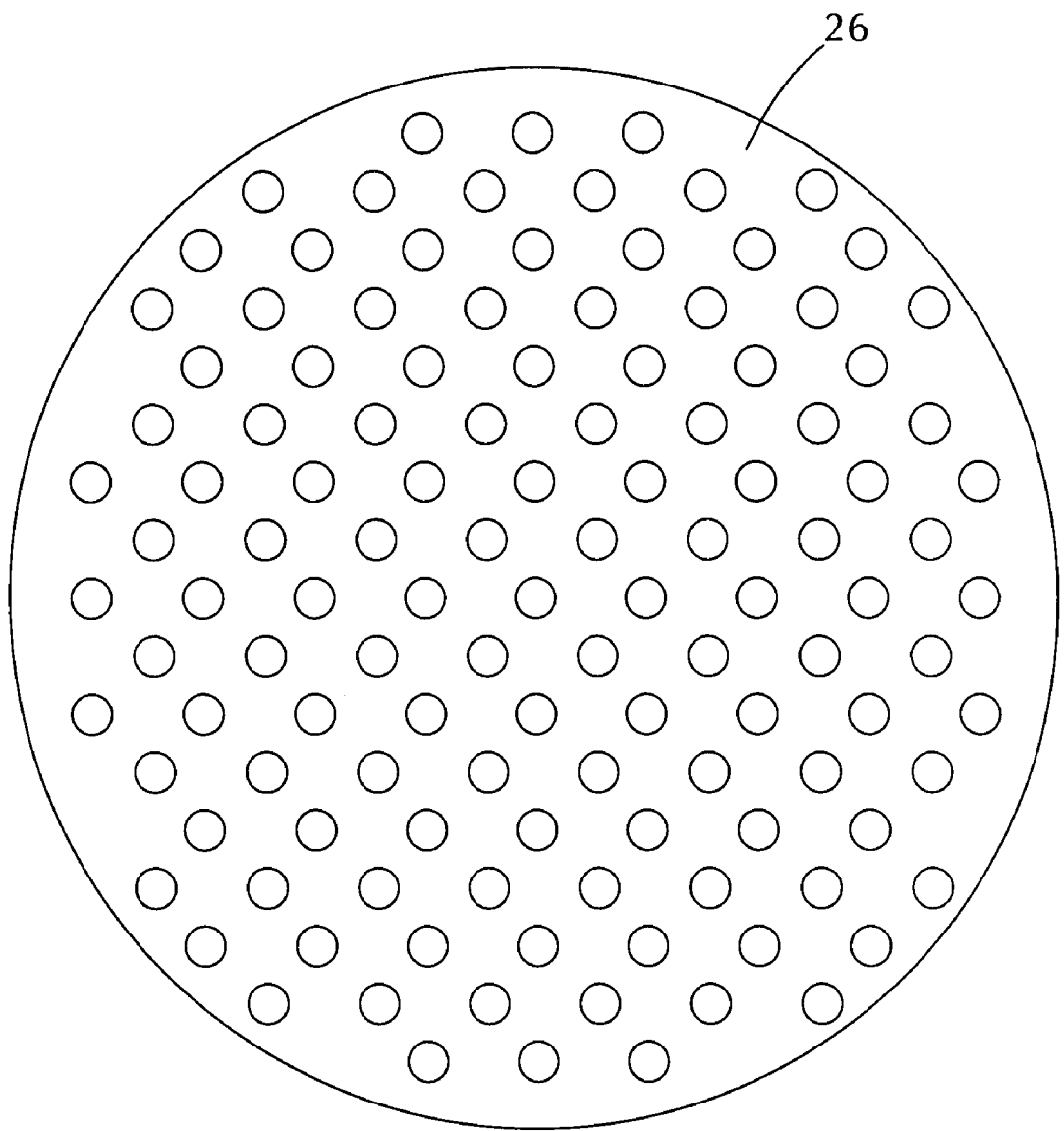
FIG. 3 is a plan view of the bottom outlet plate thereof.

Located at the bottom end of the central bore 14 is perforated bottom plate 26 further depicted in FIG. 3. Plate 26 supports the catalyst element stack, and also provides for an exit way for the decomposition products from the stack. The parallel bores through the bottom plate eject the decomposition products generally downward, along the major axis of the engine, into the tapering portion of venturi 17, which increases the velocity and lowers the pressure of the decomposition products as they are exhausted from the engine.

Figure 5:
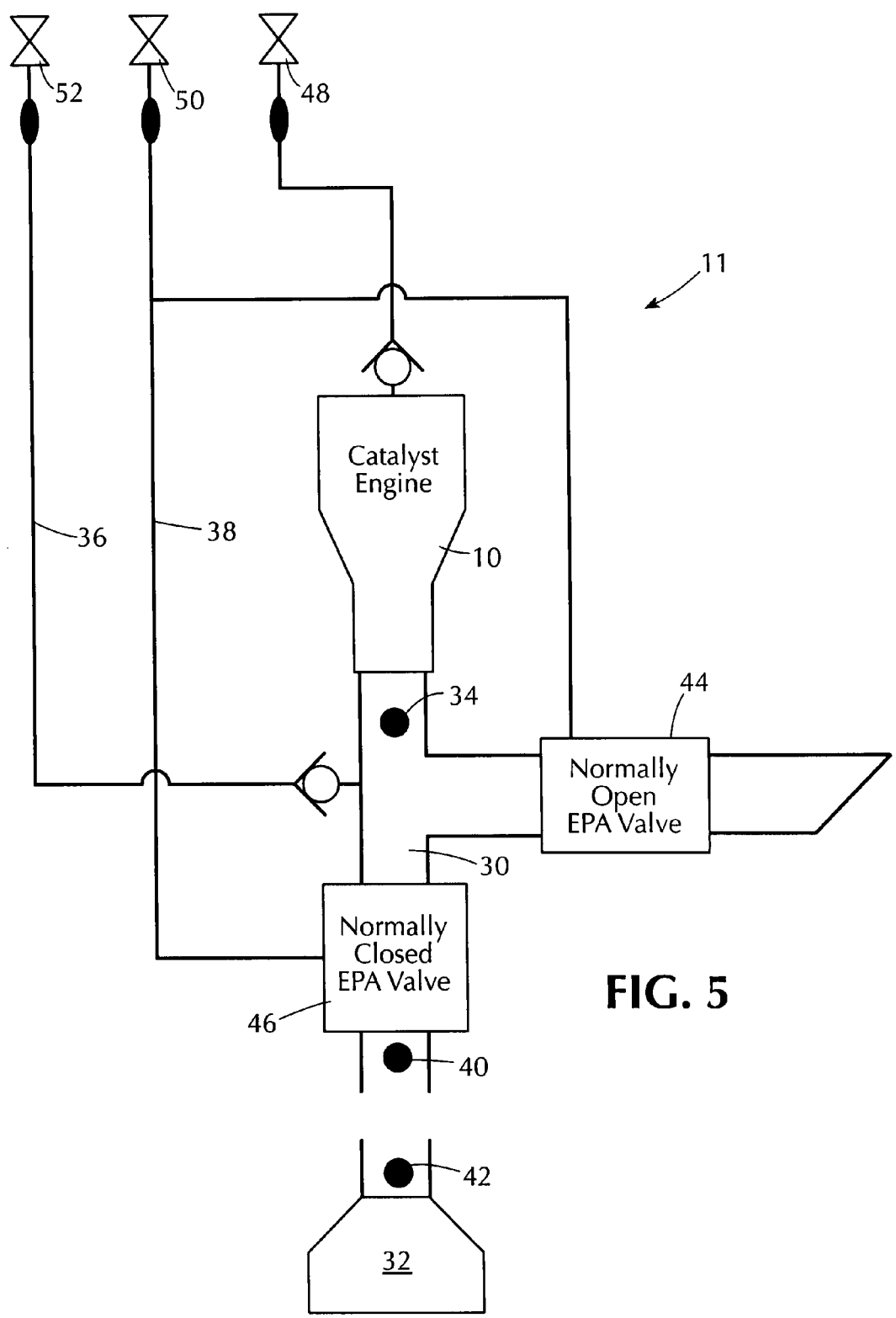
FIG. 5 is a diagrammatic representation of a system for injecting the hydrogen peroxide decomposition products into a well utilizing the inventive engine and control system.

As depicted in FIG. 5, the exit venturi of catalyst engine 10 is coupled to main delivery line 30 which delivers the decomposition products through knockoff coupler 32 to a well or other facility as appropriate. A temperature sensor, such as thermocouple 34, is positioned at the exit of the engine to monitor the exhaust temperature. Delivery lines 36 and 38, for water and air respectively, are connected to the main delivery line. A second temperature sensor 40 and a pressure sensor 42 are located in the delivery line 30 downstream of the air and water inlets, while a pair of electro-pneumatically activated (EPA) valves 44 and 46 are provided for pressure buildup and venting purposes. Valves 48, 50 and 52 control the admission of peroxide, air and water, respectively, into the system as depicted.

Figure 6:
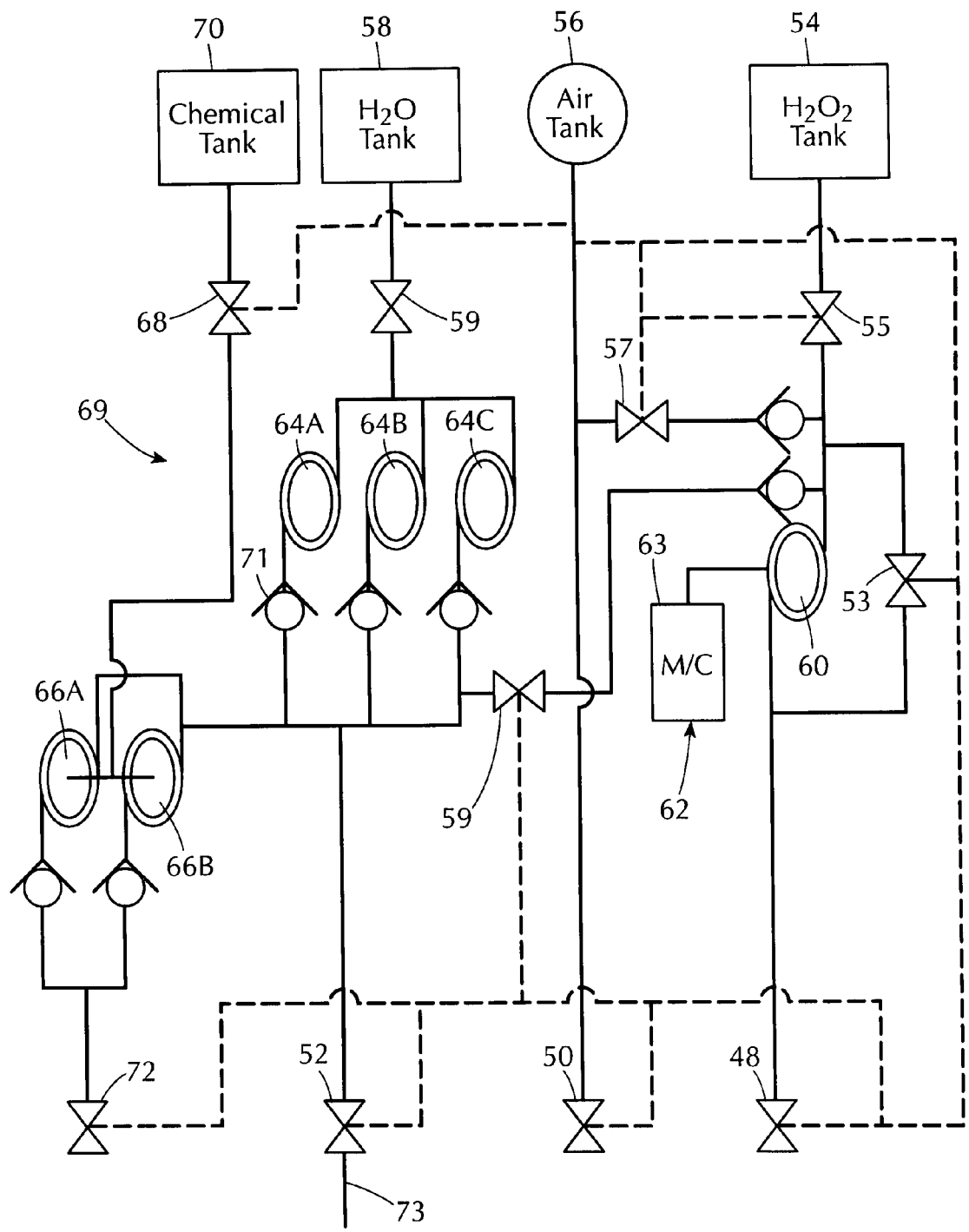
FIG. 6 is a diagrammatic representation of the supply piping for the configuration depicted in FIG. 5.

The valves 48, 50 and 52 are on the output lines from supply system 69, depicted in FIG. 6. As depicted therein, system peroxide, air and water are stored in respective tanks 54, 56 and 58. In addition, a tank 70 may be provided for auxiliary chemicals desired to be injected into the well bed. The peroxide line is provided with pump 60, while the water line is provided with low pressure pumps 64A, B and C and high pressure pumps 66A, and B. The low and high pressure water pumps 64A-C and 66A, B may each be a tandem assembly of multiple pumps to insure continuity of operation. The high pressure pumps 66A, B are blending pumps, allowing the chemicals in tank 70 to be combined with water as may be appropriate for well introduction. The system further includes appropriate piping and valving to allow pressurized air from tank 56 as well as water from tank 58 to be introduced to various lines for purging purposes as may be required. The valves themselves may be pneumatically operated, and the operating air line system for the valves is shown in dotted. The interconnections between the valves and the controllers therefor are conventional and are not otherwise shown. Disconnect fittings 71 may be utilized as appropriate to facilitate system interconnection and disassembly.

Figure 7:
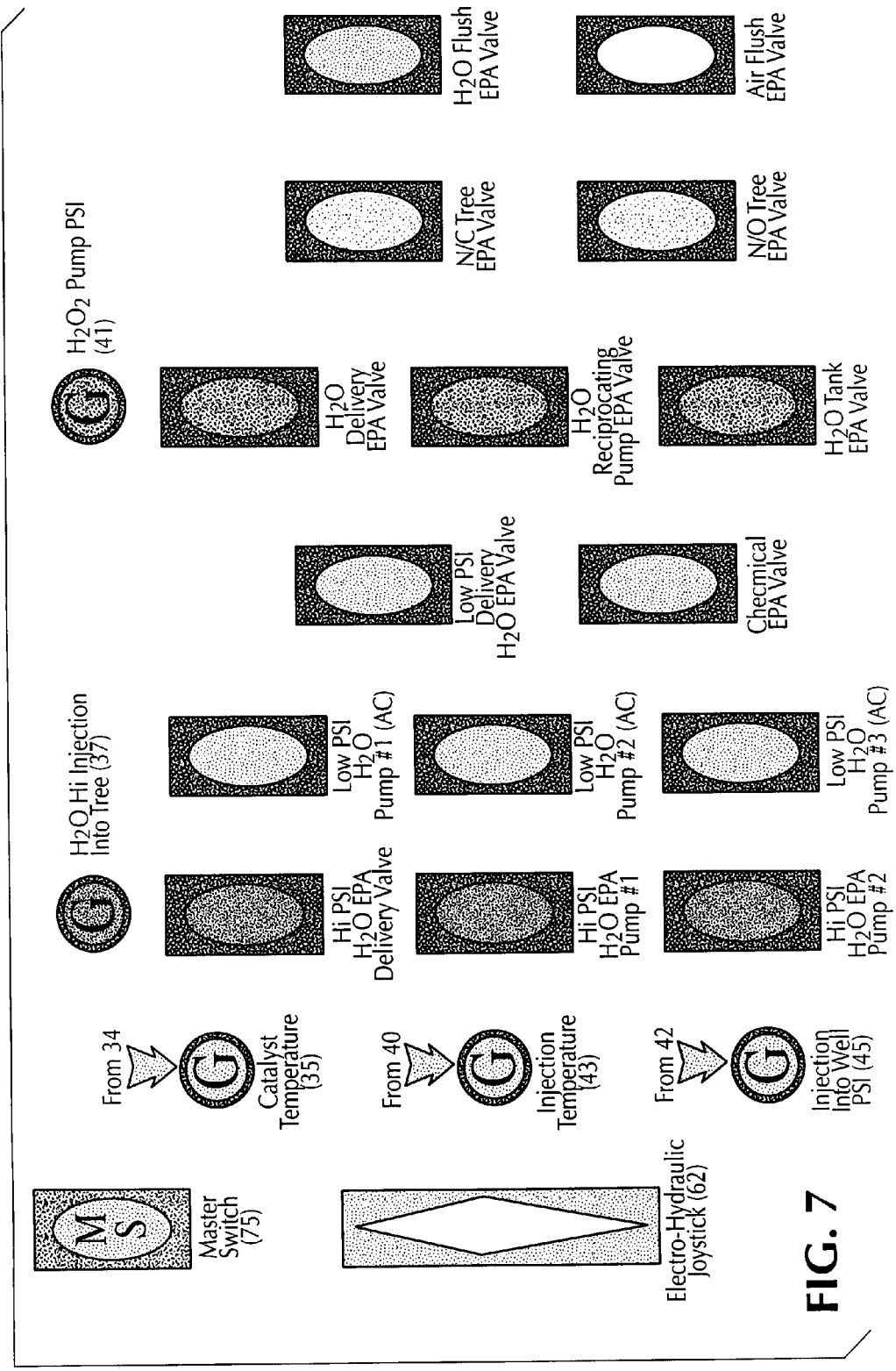
FIG. 7 is an illustration of a control panel for the control system.

FIG. 7 depicts a control panel for the operating system for the engine and piping system depicted in FIGS. 5 and 6. The control panel may be embodied in a free-standing cabinet-like structure, or may be located in a trailer or other appropriate housing near the well or other facility to be treated and is connected to a suitable source of power and to the sensors, valves and the like for the system in a conventional manner. As may be seen, it includes a series of valve operators, represented by the ovanls, corresponding to and for controlling the valves depicted in FIG. 6, along with gauges "G" 35, 43, and 45 for displaying the temperature and injection pressure monitored by the sensors 34, 40 and 42 as well as gauge 37 for monitoring the water pressure injected through line 36 and gauge 41 for monitoring the pressure at peroxide pump 60. Full operating status data of the decomposition engine and well injection components is continuously available to the system operator.

Electro-hydraulic joystick 62 is the operator control element for the peroxide pump 60 and proportionally controls the operation of the pump through an electro-hydraulic valve-controlled hydraulic motor 63. The output flow and pressure of $H_2O_2$ pump 60 is proportional to the setting of joystick 62, allowing continued and precise metering of the peroxide into the engine. At the same time, control over the other valves, and particularly the valve in water line 36, allows precise control over the temperature and pressure of the oxygen/water vapor mixture being injected into the well. As may be seen in FIG. 5, water from line 36 may be mixed with the decomposition products exiting from the engine. The high temperature steam-oxygen output of the catalyst engine 10 may be of too great a temperature for well introduction. The mixing of its decomposition products with additional water in delivery line 30 allows both the lowering of the blend temperature as a result of the heat of vaporization energy needed to convert the added water to steam, while also having pressure effects resulting from the further generation of gaseous water. By appropriate operation of the system both the temperature and pressure of the injected oxygen/steam blend can be precisely controlled.

EXAMPLE

The following is a further explanation of a typical control sequence for the operation of the peroxide decomposition and injection system of the invention incorporating the elements of the control panel of FIG. 7.
1) Initial Activation In an initial step the system is powered up. As the system will be used at an oilfield that may be without a source of electric power, a self-contained electrical power source, typically a generator (not shown), is powered up. A skid-mounted compressor (not shown) is actuated and brought up to operating pressure, typically 120 PSI, to provide compressed air for storage in air tank 56, and a hydraulic gas drive engine (also not shown) connected to a hydraulic motor (not shown) is turned on to provide hydraulic line pressure for the pumps.

Control panel master switch 75 is turned on, and a visual check is performed to confirm that that all gauges appear to be functioning properly.

2) $H_2O$ Low Pressure Pumps Check

Low PSI $H_2O$ delivery line 73 is drained to scavenge any water in the line. With main water valve 59 open, low PSI $H_2O$ EPA delivery valve 52 is opened, and each low PSI $H_2O$ pump 64A, B and C is activated individually to make sure that each pump is functioning correctly. Once the check is completed, valve 52 is closed. The first low PSI $H_2O$ pump (64A) is then activated and remains on until the well stimulation procedure is completed. If there is a pump failure, one of the parallel backup pumps, 64B or C, can be activated. Once a pump 64 is operating, low PSI $H_2O$ EPA delivery valve 52 may be opened at any time to retrieve low-pressure water.

3) Catalyst Engine Start Up

The speed of the hydraulic system's drive engine is adjusted as needed to maintain proper hydraulic line pressure. EPA valve 53 in the $H_2O_2$ line is closed and main $H_2O_2$ reciprocating EPA valve 55 from tank 54 is opened, allowing peroxide to flow to pump 60. $H_2O_2$ delivery valve 48 is also opened. Control joystick 62, coupled to the electro-hydraulic motor/controller 63 for pump 60, is slowly throttled on and off in slight increments to initially introduce $H_2O_2$ to the catalyst engine 10.

As this process is continued decomposition proceeds and catalyst temperature gauge 35 starts reading above 250° F. Once this temperature is achieved, the catalyst engine 10 is preheated enough to allow the introduction of a steady flow of $H_2O_2$ to the engine. This is accomplished by slightly easing the joystick 62 for the electro-hydraulic valve controller forward (open). $H_2O_2$ pump PSI gauge 41 allows the operator to monitor the pressure at which $H_2O_2$ is being fed into the catalyst engine 10. The temperature on the catalyst engine gauge 35 will momentarily climb to between 800° F. and 900° F. Well injection temperature, as monitored on temperature gauge 43, will also rise and equal out to the catalyst engine temperature. Depending on the operator's location, the operator can hear the catalyst engine on the tree assembly 11 as shown in FIG. 5, and can also visually verify its exhaust through normally open EPA valve 44 passing into the atmosphere.

It is to be recognized that joystick 62 for the electro-hydraulic motor/controller 63 for peroxide pump 60 is a "dead man" operator, meaning that it is normally in the off or closed position and returns to the off position automatically when hand operating pressure is removed from the joystick. Thus, the controller 63 is also normally closed or off, and open and on only when the joystick gets pushed forward. Once operator pressure is let off the joystick, the controller will immediately and automatically return to the closed off position, shutting off the pump 60.

High PSI $H_2O$ Check

With the catalyst engine 10 running at the desired operating temperature, high PSI $H_2O$ delivery EPA valve 72 is opened, and high PSI $H_2O$ pumps 66A and B are activated individually. The operator will see volumes of steam, resulting from the contact between the introduced water and the high temperature engine exhaust products, exhausting to atmosphere from catalyst tree assembly 11. $H_2O$ high PSI gauge 37 on the control panel, monitoring the pressure of the injected water, will also confirm the pressure at which the water is being introduced. As water is introduced, well injection temperature gauge 45 will read lower than catalyst temperature gauge 35. After the high PSI check is completed, high PSI $H_2O$ pump 66A/B is turned off to stop introduced water flow. (If one of the high PSI $H_2O$ pumps 66A, B has a failure, the other pump can be used.)

Joystick 62 is released to shut off peroxide pump 60, and main $H_2O_2$ reciprocating EPA valve 55 and high PSI $H_2O$ delivery EPA valve 72 are closed. $H_2O_2$ reciprocating pump EPA valve 53 is opened.

4) System Run

The system is now ready for well injection. At this point a desired well injection temperature is determined, and a main gate valve (not shown) on the well, attached to the catalyst tree assembly 11 by means of knockoff coupler 32, must be open. $H_2O_2$ reciprocating pump EPA valve 53 is closed, and $H_2O_2$ valves 55 and 48 are opened. Joystick 62 for the electro-hydraulic motor/controller 63 is throttled to start up catalyst engine 10. Once the catalyst engine 10 is at operating temperature, typically 800° F.-900° F.), observed on the catalyst temperature gauge 35, high PSI $H_2O$ delivery EPA valve 72 is opened and high PSI $H_2O$ pump 66A or B is activated. When the determined well injection temperature is met and maintained by observing well injection temperature gauge 43 (and is obtained by cycling high PSI $H_2O$ pump 66A or B) the normally closed (N/C) tree EPA valve 46 is opened and the normally open (N/O) tree EPA valve 44 is closed, stopping venting and allowing the engine exhaust and introduced water blend to enter the well. Joystick 62 is throttled as required to maintain pressure. N/C tree EPA valve 46 must be opened before N/O tree EPA valve 44 is closed. By the operator throttling forward on the joystick 62, appropriate delivery pressure into the well can be controlled and maintained as the operator observes the well injection PSI gauge 45.

6) Chemical Injection

While the system is running down hole, chemical additives can be injected by blending them with injected water. Chemical EPA valve 68 is opened to feed the additive to pumps 66. The additive is introduced into the high pumps through a suction port.

7) Shutdown and Peroxide Line Flush

Well stimulation is typically completed when the well PSI gauge 45 shows a spike in pressure. Once the injection is completed, N/O tree EPA valve 44 is re-opened and N/C tree EPA valve 46 is closed. High PSI $H_2O$ pump 66A or B is shut down, high PSI delivery EPA valve 72 is closed, joystick 62 is released, $H_2O_2$ delivery EPA valve 48 is closed, $H_2O_2$ reciprocating pump valve 55 is opened and $H_2O_2$ tank EPA valve 53 is closed.

To flush the $H_2O_2$ fuel line $H_2O_2$ tank EPA valve 55 must be closed. The $H_2O_2$ fuel line is disconnected from catalyst engine 10, and the disconnected end of the line is placed in a bucket half full of water. $H_2O$ flush EPA valve 59 is opened, and the line is flushed out until only $H_2O$ is present. $H_2O$ flush EPA valve 59 is then closed. Air flush EPA valve 57 is opened until the remaining water in the line is removed, and the air flush EPA valve is then closed. The now clean $H_2O_2$ delivery line is capped and disconnected for storage. The peroxide-containing flush bucket is topped off with water and the diluted $H_2O_2$ discarded as appropriate.

Low PSI $H_2O$ pump 64A, B or C is shut down. Master power switch 75 for the control panel is turned off. The hydraulic gas drive, compressor, and generator are shut down. Tree 15 is disconnected from the well. A backup manual override system may be provided to activate the low PSI $H_2O$ pump and delivery line if water is needed at any time.

The present system provides for effective and precise control over peroxide decomposition, blending of the decomposition products with water and additives as desired, and monitoring of injection of the resulting high temperature blend into a well or other facility. It also allows for efficient trouble shooting and shutdown in the unlikely event of a problem.

If the catalyst temperature radically declines, $H_2O_2$ pump PSI gauge 41 can be checked for pressure.

If there is a large decrease in pressure, a normal shutdown sequence can be followed, as there is no available $H_2O_2$. If pressure reads correct, joystick 62 should be immediately released. High PSI $H_2O$ pump 66A or B should remain active for approximately five seconds to assist in cooling the system; N/O tree EPA valve 44 is then opened to vent the system to the atmosphere while N/C tree EPA valve 46 is closed to cap the well.

If there is a loss of $H_2O$ pump 66A or B pressure, N/O tree EPA valve 44 should be opened N/C tree EPA valve 46 closed. Joystick 62 is released and $H_2O$ low and high PSI checks performed. Once the checks are completed, shut down any defective pump and energize back ups.

What is claimed is:

1. An apparatus for the controlled injection of a hydrogen peroxide decomposition mass, comprising a hydrogen peroxide source, a decomposition engine for the decomposition of hydrogen peroxide coupled to the hydrogen peroxide source; an exit passageway coupled to the engine for directing produced decomposition products from the engine to a target location; first and second valve means located in the exit passageway for selectively diverting the decomposition products to or away from the target location; and control means coupled to the source, the engine and the valve means for controlling the decomposition process, for selectively adjusting at least one of the temperature and pressure of the decomposition products passing through the exit passageway and the diversion of the decomposition products, during the directing of the decomposition products to the target location, the control means comprising a proportional pump associated with the hydrogen peroxide source for controlling the flow of hydrogen peroxide into the engine, a pump associated with a fluid source coupled to the exit passageway, and a pair of temperature sensors located in the exit passageway, the temperature sensors configured to control the operation of the hydrogen peroxide proportional pump.

2. The apparatus of claim 1, wherein the selective adjustment means comprise means for mixing a fluid from the fluid source with the decomposition products in the exit passageway.

3. The apparatus of claim 2, wherein the fluid is water.

4. The apparatus of claim 2 wherein the pair of temperature sensors are located in the exit passageway and positioned up- and downstream of the fluid mixing means and means for controlling the flow of hydrogen peroxide into the engine, the temperature sensors configured to control the operation of the fluid pump.

5. The apparatus of claim 2 wherein the hydrogen peroxide flow control means comprise a pump control system comprising a joystick.

6. The apparatus of claim 5 wherein the joystick is a deadman joystick.

7. The apparatus of claim 2 wherein the fluid mixing means comprise means for blending two different fluids together to yield the fluid mixed with the decomposition products.

8. The apparatus of claim 7 wherein one of the two different fluids is an additive chosen for its reactive properties with well contents.

* * * * *